United States Patent [19]

Lisec

[11] Patent Number: 4,854,022

[45] Date of Patent: Aug. 8, 1989

[54] DEVICE FOR THE FORMATION OF A CORNER OF FLEXIBLE SPACERS FOR GLASS PLATES

[76] Inventor: Peter Lisec, Bahnhofstrasse 34, A-3363 Amstetten-Hausmening, Austria

[21] Appl. No.: 111,415

[22] Filed: Oct. 20, 1987

[30] Foreign Application Priority Data

Nov. 3, 1986 [AT] Austria ............................ A 2927/86

[51] Int. Cl.[4] ......................... B23P 21/00; B32B 31/18

[52] U.S. Cl. .................................... 29/33 K; 156/106; 156/492

[58] Field of Search .................... 29/33 K, 34 R, 56.6, 29/771, 782, 787, 788, 564.2, 564.7; 156/106, 107, 492, 475, 522

[56] References Cited

U.S. PATENT DOCUMENTS

| | | | |
|---|---|---|---|
| 2,713,437 | 7/1955 | Broden . | |
| 2,804,101 | 8/1957 | Johnson et al. | 29/33 K |
| 4,120,740 | 10/1978 | Morgan et al. | 156/522 |
| 4,257,150 | 3/1981 | Heffner et al. | 29/33 K |
| 4,494,283 | 1/1985 | Lisec | 29/33 K |
| 4,561,929 | 12/1985 | Lenhardt | 156/106 |
| 4,743,336 | 5/1988 | White | 156/522 |
| 4,769,105 | 9/1988 | Lisec | 156/522 X |

FOREIGN PATENT DOCUMENTS

| | | | |
|---|---|---|---|
| 104145 | 3/1984 | European Pat. Off. | 29/34 R |
| 3404006 | 8/1985 | Fed. Rep. of Germany | 29/33 K |

*Primary Examiner*—William Briggs

*Attorney, Agent, or Firm*—Young & Thompson

[57] ABSTRACT

A device for the formation of a corner of a flexible spacer (2) attached to a glass plate (1) exhibits a-clamp (11) pivotable by 90°, one of the two clamping jaws (12), with the clamp (11) having been pivoted, urging the section (7) of the spacer (2) held by the clamp (11) against an abutment (17). Additionally, a pressure ram (20) is provided which can be advanced transversely with respect to the glass plate (1), this pressure ram pressing the bent end (7) of the spacer (2) against the glass plate (1). It is furthermore possible to provide in the device a perforating tool (30, 32, 38), mounted, for example, to a clamp (11 or 35), especially the outer clamping jaw (12, 37) thereof, this tool perforating the spacer (2) while the latter is being held by the clamp (11 or 35).

14 Claims, 3 Drawing Sheets

DEVICE FOR THE FORMATION OF A CORNER OF FLEXIBLE SPACERS FOR GLASS PLATES

Figure 1:
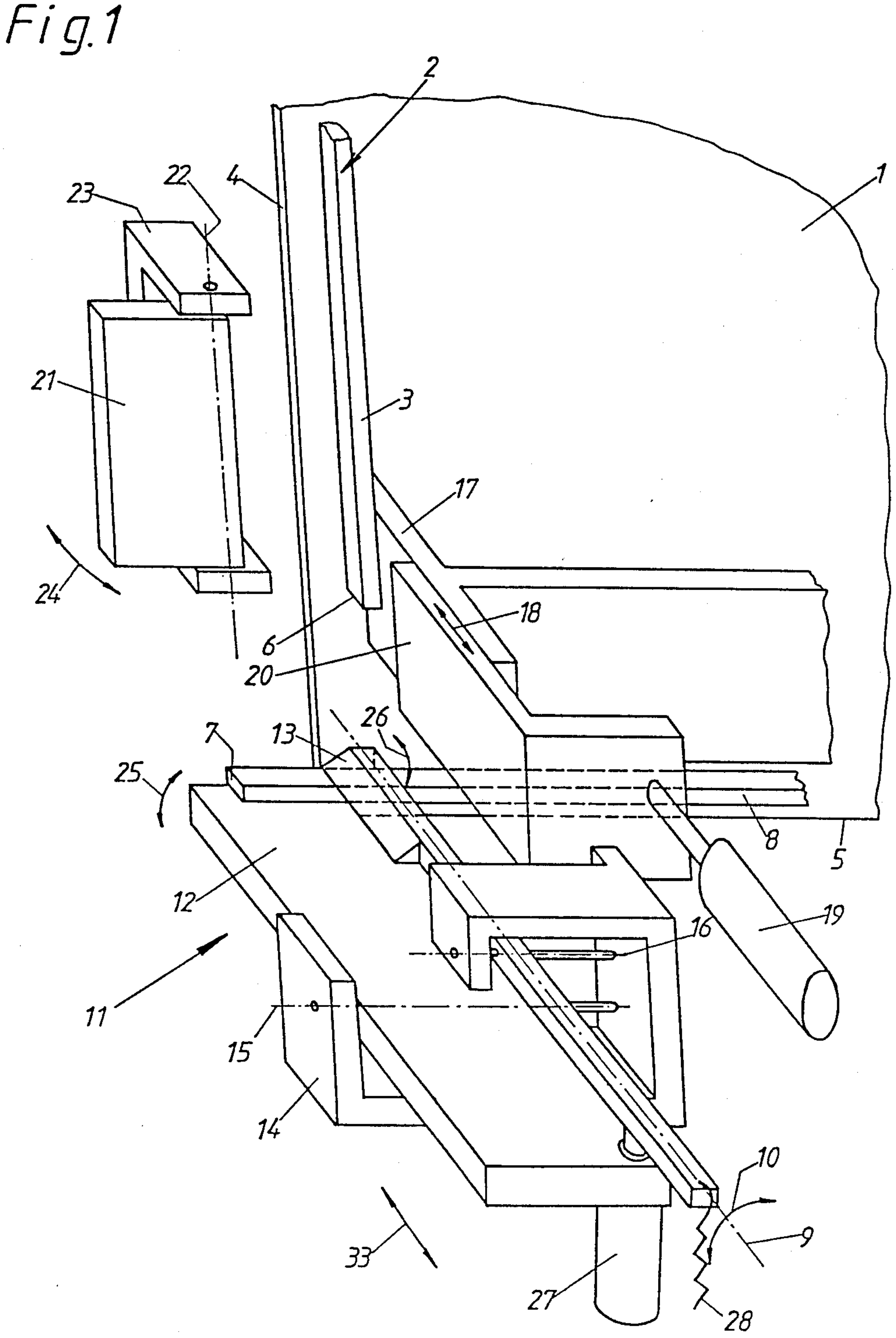

The invention relates to a device for the formation of a corner of a flexible spacer attached to a glass plate, one end of the spacer overhanging past the glass plate.

Devices for attaching flexible spacers to glass plates during the course of producing insulating glass panes have been known wherein, with the aid of an attaching tool, the flexible spacer frame is attached in one step along the rim of the glass plate in correspondence with the desired depth of the edge joint. Problems are encountered in these devices in connection with the formation of the fourth (and last) corner, as well as the joining of the two ends of the spacer.

The invention is based on the object of providing a device of the type discussed hereinabove which operates in a simple and reliable fashion and makes it possible to obtain cleanly formed corners as well as a secure and adequately tight joining of the ends of the spacer.

This object has been attained according to the invention by providing a clamp that can be applied from both sides to the preferably horizontally overhanging end of the spacer, this clamp, after seizing the end, being pivotable about an axis perpendicular to the glass plate by 90° and being slidable back and forth perpendicularly to the plane of the glass plate to which the spacer is attached.

By means of the device according to this invention, the protruding end—normally being the end of the spacer horizontally overhanging at the lower, horizontal rim—is seized and bent so that the free end of this section of the spacer is brought adjacent the other end of the spacer. Thus, it is possible in a single working step to form the fourth corner as well as to juxtapose the two ends of the spacer to each other.

Since the protruding end of the spacer will ordinarily be located in the zone of the bottom, horizontal rim of the glass plate, it has proven to be advantageous within the scope of this invention to make the clamp pivotable from a horizontal position into a vertical position.

According to one embodiment of the invention, the provision is made that a pressure ram advanceable perpendicularly to the plane of the glass plate is provided for pressing into contact the end of the spacer bent by the clamp. This embodiment ensures that also the end bent over by the clamp will be urged against the glass plate with the corresponding force. In this connection, it is preferred to make the advanceable pressure ram effective in a plane lying between the clamping jaws of the clamp.

Alignment of the glass plate with respect to the clamp of the device according to this invention is accomplished in an especially simple way by providing a stop aligned with respect to the pivot axis of the clamp and being swingable forwards into the conveying plane of the glass plate about an axis affixed in the frame, the rearward, vertical rim of the glass pane, in the zone of which the open ends of the spacer are located, being positioned against this stop.

According to a preferred embodiment of the invention, the provision is made that the clamping jaw of the clamp that can be brought into contact with the inside of the spacer is designed to be narrower than the other clamping jaw that can be brought into contact with the outside of the spacer. Thanks to this embodiment, it is readily possible to design the pressure ram, advanceable transversely to the plane of the glass plate, to have a shorter stroke, since the narrower clamping jaw can swing past underneath this pressure ram when the clamp is operated.

Especially sharp corners are obtained in the spacer if the inner edge adjoining the clamping surface of the narrower clamping jaw lies in the axis of rotation of the clamp.

In a practical embodiment of the invention, the provision can be made that a combination of tension spring and pressure medium motor is included for operating the clamping jaws of the clamp. In this arrangement, it is advantageous for the tension spring to exert its bias on the clamp for its open position, and for the pressure medium motor to close the clamp.

The movements required for utilizing the device of this invention, perpendicularly to the plane of the glass plate, and the pivoting motion by 90°, can be realized in an especially simple way by mounting the shaft, which holds the clamp to be pivotable about the axis, on a slide that can be shifted forwards and backwards transversely to the plane of the glass plate. This arrangement of the invention also makes it possible to mount the pressure ram, advanceable perpendicularly to the plane of the glass plate, to be displaceable on this slide.

For the secure pressing together of the two ends of the spacer, it is recommended within the scope of this invention to arrange in opposition to the outer clamping jaw an abutment affixed to the slide; this abutment, with the clamp advanced and pivoted, is in contact with the inside of the spacer in the zone of the joint between the ends of the spacer and lies in opposition to the broader clamping jaw. In this embodiment, the two ends of the spacer attached to the glass plate are stressed from both sides between one of the clamping jaws (the broader clamping jaw) of the clamp and the abutment affixed to the slide, so that the ends of the spacer are securely joined under pressure.

It has been found that the glass plates of insulating glass manufactured with the use of flexible spacers (swiggle strips) approach each other during the pressure joining step with the mutual spacing being reduced, since the spacer is subject to a certain extent of plastic deformation during the pressing of the insulating glass. This reduction in spacing of the glass plates results in an increase of the internal pressure in the insulating glass pane, causing the glass panes to bulge outwardly. In order to avoid this drawback, the device of this invention can be additionally characterized in that a device for perforating the spacer is associated with the clamp. The provision of the device for perforating in the device of this invention is especially advantageous for the reason that this is a point in the manufacture of insulating glass where the spacer is firmly clamped in place from four sides, namely by the glass plate, the advanced pressure ram, the broader clamping jaw of the clamp, and by the abutment affixed to the slide. If the attempt were made to perforate a spacer by simply piercing same with a needle or a similar punching tool, then this could not be accomplished inasmuch as the spacer yields and does not retain its position on the glass plate.

In one embodiment that can be realized independently of the device of this invention for forming a corner of a flexible spacer, the provision is made to include a means for perforation of the spacer combined with a clamp that can be brought into contact with the horizontal section of the spacer.

After the insulating glass has been pressed, the perforation produced in the spacer by means of the device of this invention is resealed by application of heat, for example with the aid of a hot-air blower, or more preferably by forced introduction of an appropriate amount of butyl rubber (a plug of butyl rubber).

In a preferred embodiment, the provision is made that the device for perforating the spacer exhibits a punching ram guided in bores in the broader clamping jaw and the abutment.

The device of this invention is suitable for use in arrangements designed extensively arbitrarily for attaching flexible spacers to glass plates However, it is preferred within the scope of this invention to arrange the clamp at the outlet side of an apparatus for attaching a flexible spacer to a glass plate, which apparatus is used for mounting a spacer along the rim of the glass plate starting upwardly on the rearward, vertical rim and ending at the lower, horizontal rim of the glass plate, the end of the spacer overhanging horizontally toward the rear past the glass plate, wherein the extent of overhang corresponds to the distance of the end of the spacer in the zone of the rearward, vertical rim from the lower section of the spacer.

Figure 2:
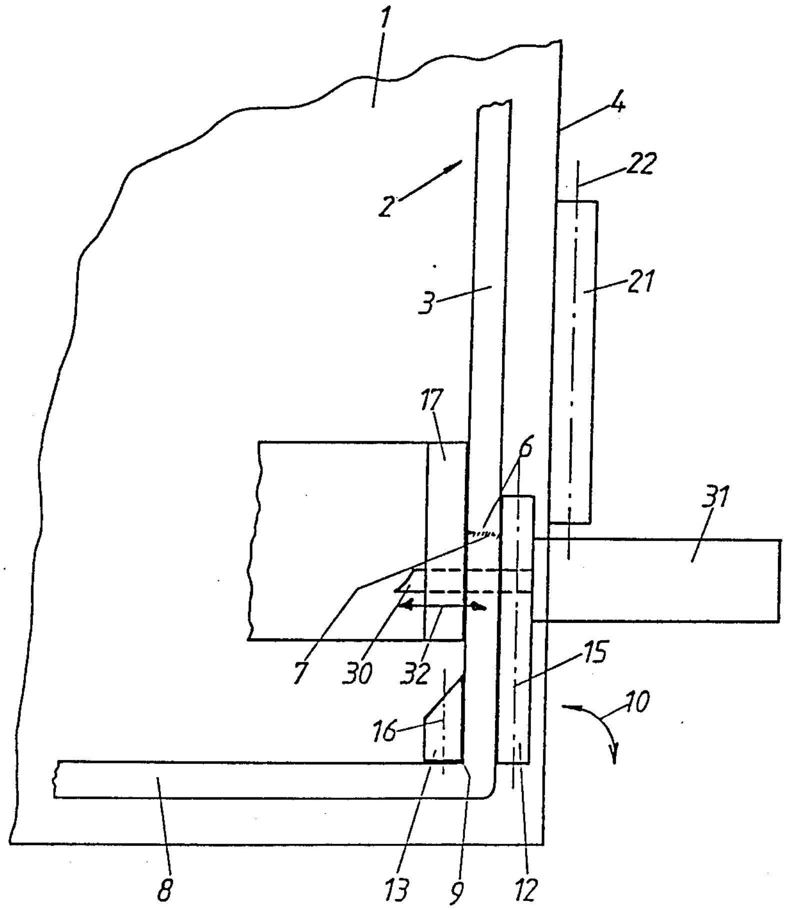
Figure 3:
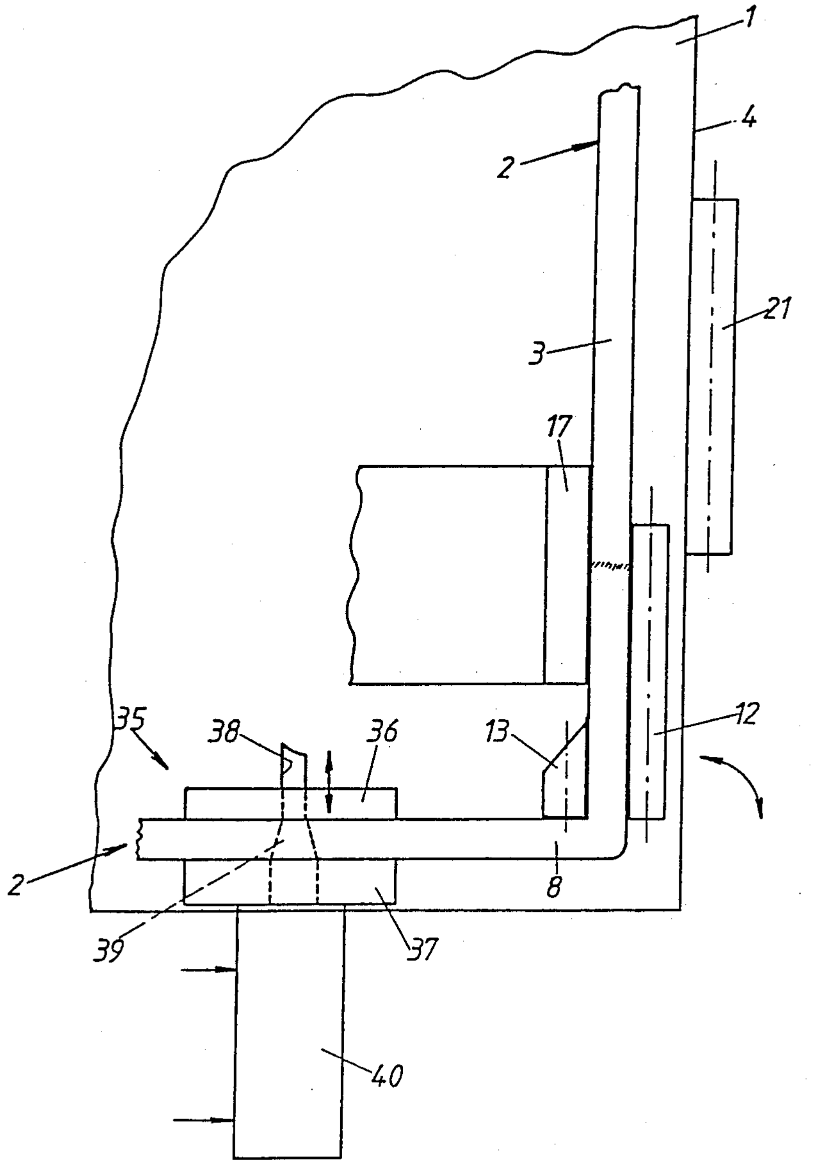

Additional details and features of the invention can be seen from the following description with reference to the drawings wherein:

FIG. 1 shows, in a partially schematized view, the essential parts of a device according to this invention, FIG. 2 shows the device of this invention seen from the rear of FIG. 1, in a different operating position, and FIG. 3 shows an embodiment wherein the device for perforating the spacer is arranged separately from the clamp for forming the corner.

Before describing the device of this invention in detail, it is to be pointed out that a glass plate 1, to which previously a flexible spacer 2 (swiggle strip) has been attached, is retained while standing upright on a conveying means, not shown in FIG. 1, which engages at the lower, horizontal rim 5 of the glass plate 1, and while in contact with a supporting wall, designed, for example, as a roller zone, which is slightly inclined with respect to the vertical. The conveying track engaging at the lower, horizontal rim 5 of the glass pane 1, designed, for example, as a succession of conveying rollers, and the lateral support for the glass plate 1 are mounted in a machine frame which latter is not illustrated, either.

It can be seen from FIG. 1 that the spacer 2 has been attached to the glass plate 1 so that the section 3 of the spacer 2 (i.e. the section with which the attachment step is started) extends in parallel to the rearward, vertical rim 4 of the glass plate 1 and terminates at a distance from the lower, horizontal rim 5 of the glass plate 1 (end 6).

It can also be seen from FIG. 1 that the end 7 of the section 8 of the spacer 2, extending in parallel to the lower, horizontal rim 5 projects horizontally past the vertical rim 4 of the glass plate 1.

By means of the device of this invention, the overhanging end 7 of the spacer 2 is now bent upwards about an axis 9 oriented perpendicularly to the glass plate 1 in the direction of double arrow 10 so that the two ends 6 and 7 are adjacent each other.

For this purpose, the device of this invention comprises a clamp 11 with a broader clamping jaw 12 and a narrower clamping jaw 13 which can be brought into contact with the inside of the spacer 2. The clamping jaw 12 as well as the clamping jaw 13 of the clamp 11 are pivotably mounted in a holder 14 to be movable about axes 15 and 16, respectively, the axes 15 and 16 being oriented in parallel to the plane of the glass plate 1. The holder 14 of the clamp 11 can be swung about the axis 9 oriented perpendicularly to the plane of the glass plate 1. For this purpose, the holder 14 is connected to an operating shaft, not shown, associated with a motor, for example a pressure medium motor, in order to perform pivoting of the clamp 11 by 90°. Additionally, the clamp 11 can be advanced and retracted by way of its operating shaft (not shown) in the direction of the pivot axis 9, i.e. perpendicularly to the plane of the glass plate 1. For this purpose, the operating shaft is mounted rotatably at a slide which latter is arranged in the machine frame to be displaceable perpendicularly to the plane of the glass plate 1.

The slide carrying the clamp 11 furthermore comprises an abutment 17 which, with the slide having been advanced toward the glass plate 1 and thus also with the clamp having been advanced to directly in front of the glass plate 1, is in contact from the inside against the section 3 of the spacer 2 in the zone of its end 6. The abutment 17 is rigidly joined to the slide.

Furthermore, the device of this invention comprises a pressure ram 20 which can be displaced in the forward and rearward directions with respect to the slide carrying the clamp 11 in the direction of double arrow 18 by means of a pressure medium motor 19; this pressure ram is guided against the contacting abutment 17.

Further, the device of this invention includes a stop 21 mounted in a holder 23 affixed to the frame so that the stop is pivotable about an axis 22 parallel to the vertical rim 4 of the glass plate 1. A drive mechanism, not shown in detail, for example a pressure medium motor, is provided for operating the stop 21 in the direction of double arrow 24. The stop can be swung from the position shown in FIG. 1 by 90° so that it projects into the conveying plane of the glass plate 1 and the glass plate can be positioned with its vertical rim 4 in exact alignment with respect to the clamp 11, the abutment 17, and the pressure ram 20.

A pressure medium motor 27 and a tension spring 28 are provided for operating the clamping jaws 12 and 13 of the clamp, i.e. for opening and closing the clamp 11 (arrows 25 and 26). The tension spring 28 stresses the clamps, and especially the clamp 13, along the lines of an opening movement whereas the pressure medium motor 27 effects closing of the clamp 11.

FIG. 2 shows the operative position of the various components of the device according to this invention wherein the view is from the rear through the glass plate 1. It can be seen that the glass plate 1 is in contact with its vertical rim 4 against the stop 21. It can furthermore be seen that the abutment 17 is in contact with the section 3 of the spacer 2. The two clamping jaws 12 and 13 are illustrated in their position pivoted by 90° with respect to FIG. 1, wherein the axis 9 extends in the region of the inner, lower corner of the clamping jaw 13.

FIG. 2 also shows a unit for perforating the spacer 2 attached to the glass plate 1, integrated into the device according to this invention. This unit comprises a punching ram 30 which can be advanced and retracted in the direction of double arrow 32 by means of a pressure medium motor 31. During this step, the punching ram 30 passes through bores in the clamping jaw 12 as well as in the abutment 17, and the pressure medium motor 31 is connected, for example, with the clamping jaw 12.

The device of this invention operates as follows:

First of all, a glass plate 1 to which a spacer 2 has been attached in an apparatus located upstream of the present device, is positioned with its vertical, rearward rim 4 against the stop 21, the glass plate 1 being ordinarily transported coming from the left-hand side of FIG. 1. Thus, first of all the stop 21 will be in the position shown in FIG. 1 and, after passage of the glass plate 1, will be flipped forwards into its operative position, whereafter the rim 4 of the glass plate 1 is brought in contact therewith.

Once the glass plate 1 has been positioned, the slide carrying the clamp 11, the pressure ram 18 and the abutment 17 is advanced in the direction of double arrow 33 toward the glass plate 1. During this step, the abutment 17 comes into contact with the inside of the section 3 of spacer 2, and the clamping jaws 12 and 13 of the clamp 11 are arranged on both sides of the end 7 of the horizontal section 8 of spacer 2. By operation of the pressure medium motor 27, the clamping jaws 12 and 13 are swung about their axes 15 and 16, respectively, and clamp between them the end 7 of the spacer 2.

At this point, by pivoting the holder 14 about the axis 9 in the direction of double arrow 10, the clamp 11 is pivoted by 90° so that the ends 6 and 7 of the spacer 2 are adjacent each other, the zone of adjacency of the ends 6 and 7 being compressed between the broader clamping jaw 12 of the clamp 11, on the one hand, and the abutment 17, on the other hand. Additionally, the pressure ram 20 is then also advanced, by actuating its pressure medium motor 19, in the direction of double arrow 18 toward the glass plate 1 until the pressure ram is in contact with the narrow faces of the spacer 2 and forces the latter firmly against the glass plate 1. The device now assumes the position illustrated in FIG. 2 and, if desired, the punching ram 30 can be advanced with the aid of its pressure medium motor 31 for producing a perforation in the spacer 2. During this procedure, any kind of deformation of the spacer 2 which, after all, consists of soft, flexible butyl rubber with a thin, corrugated metal insert (swiggle strip), is precluded since the spacer 2 is securely held on all four sides.

Due to the fact that the clamp 11 is pivoted about the axis 9, the fourth corner of the spacer 2 is likewise cleanly shaped.

After termination of these activities, the clamp 11 is opened, the pressure ram 20 is retracted, and finally the slide carrying the clamp 11 and the abutment 17 is moved away from the glass plate 1 in the direction of double arrow 33 so that the glass plate can be further transported without hindrance and is conveyed, for example, to an assembly station for insulating glass.

According to another embodiment (FIG. 3), the unit for perforating can also be associated with the lower, horizontal section 8 of the spacer 2. In this embodiment, the punching ram 38 is combined with a clamp 35 displaceable toward the glass plate 1; the clamping jaws 36, 37 of this clamp can be brought into contact with the spacer 2 from both sides. Between the clamping jaws 36, 37 of the clamp 35, a pressure ram can be provided which, in a similar manner as the pressure ram 20 of the embodiment shown in FIGS. 1 and 2, can be brought in contact under pressure with the narrow side of the spacer 2. The movements of the clamp 35 suitably take place simultaneously with the contacting of the clamp 11 against the end 7 of the horizontal section 8 of spacer 2.

What is claimed is:

1. Device for the formation of a corner of a flexible spacer attached to a glass plate, wherein one end of the spacer protrudes beyond the glass plate, with a clamp holding the spacer during formation of the corner in the latter and being pivotable relatively to the glass plate about an axis perpendicular to the glass plate, which clamp has means which are brought into contact with the spacer from both sides, characterized in that the clamp (11) which has means (12, 13) which are brought into contact with the end (7) of the spacer (2) protruding beyond the glass plate (1) is mounted to be pivoted, after seizing the end (7) of the spacer (2) with the glass plate (1) being at a standstill, by 90° from a horizontal position (FIG. 1) into a vertical position (FIG. 2); and that a pressure ram (20) advanceable (arrow 18) perpendicularly to the plane of the glass plate (1) is provided for pressing the end (7) of the spacer (2), bent by the clamp (11), against the glass plate (1).

2. Device according to claim 1, characterized in that the clamp (11) can be advanced and retracted (arrow 33) perpendicularly to the plane of the glass plate (1) to which the spacer (2) is attached.

3. Device according to claim 1, characterized in that a stop (21) is provided which is aligned with respect to the pivot axis (9) of the clamp (11) and can be swung forwards into the conveying plane of the glass plate (1) about an axis (22) fixed in the frame, the rearward, vertical rim (4) of the glass plate (1), in the zone of which the open ends (6, 7) of the spacer (2) are located, being in contact with this stop (21) during formation of the corner in the spacer (2).

4. Device according to claim 1, characterized in that the clamping jaw (13) of the clamp (11) that can be brought into contact with the inside of the spacer (2) is designed to be narrower than the other clamping jaw (12) that can be brought into contact with the outside of the spacer (2); and that an abutment (17) is provided, this abutment, with the clamp (11) being advanced and pivoted, lying in opposition to the broader clamping jaw (12) while in contact with the inside of the spacer (2) in the zone of adjacency of the ends (6, 7) of the spacer (2).

5. Device according to claim 4, characterized in that the inner edge, adjoining the clamping surface of the narrower clamping jaw (13), lies in the axis of rotation (9) of the clamp (11).

6. Device according to claim 2, characterized in that the shaft which holds the clamp (11) to be pivotable about the axis (9) is mounted on a slide that can be displaced forwards and backwards (arrow 33) perpendicularly to the plane of the glass plate (1).

7. Device according to claim 1, characterized in that the clamp (11) is associated with a unit (30, 32) for performing the spacer (2).

8. Device according to claim 7, characterized in that the unit for perforating the spacer (2) exhibits a punching ram (30) guided in bores in the broader clamping jaw (12) and in the abutment (17).

9. Device according to claim 1, characterized in that a unit (35, 36, 38) for perforating the spacer (2) in provided, this unit being combined with a clamp (35) that can be brought into contact with the horizontal section (8) of the spacer (2).

10. Device according to claim 9, characterized in that the unit for perforating comprises a punching ram (38) advanceable through bores in the clamping jaws (36, 37) of the clamp (35).

11. Device according to claim 9, characterized in that a pressure medium motor (40) operating the punching ram (38) is mounted to one of the two jaws (36, 37) of the clamp (35).

12. Device according to claim 8, characterized in that the punching ram (38) has a conical part (39) which, with the punching ram (38) having been advanced into its operative position, is arranged in the zone of the spacer (2).

13. Device according to claim 9, characterized in that the clamp (36, 37) can be displaced forwards and backward perpendicularly to the plane of the glass plate (1).

14. Device according to claim 1, characterized in that the clamp (11) is arranged at the end on the outlet side of an apparatus for attaching a flexible spacer (2) to a glass plate (1), which apparatus is used for attaching a spacer (2) along the rim of the glass plate (1) starting upwardly at the rearward, vertical rim (4) and ending at the lower, horizontal rim (5) of the glass plate (1), wherein the end (7) of the spacer (2) protrudes horizontally toward the rear beyond the glass plate (1), and wherein the extent of protrusion corresponds to the distance of the end (67) of the spacer (2) in the region of the rearward, vertical rim (4) from the lower section (8) of the spacer (2).

* * * * *